2,917,487
METHOD OF SEPARATING 2,4-XYLENOL AND 2,5-XYLENOL BY SELECTIVE RESINIFICATION

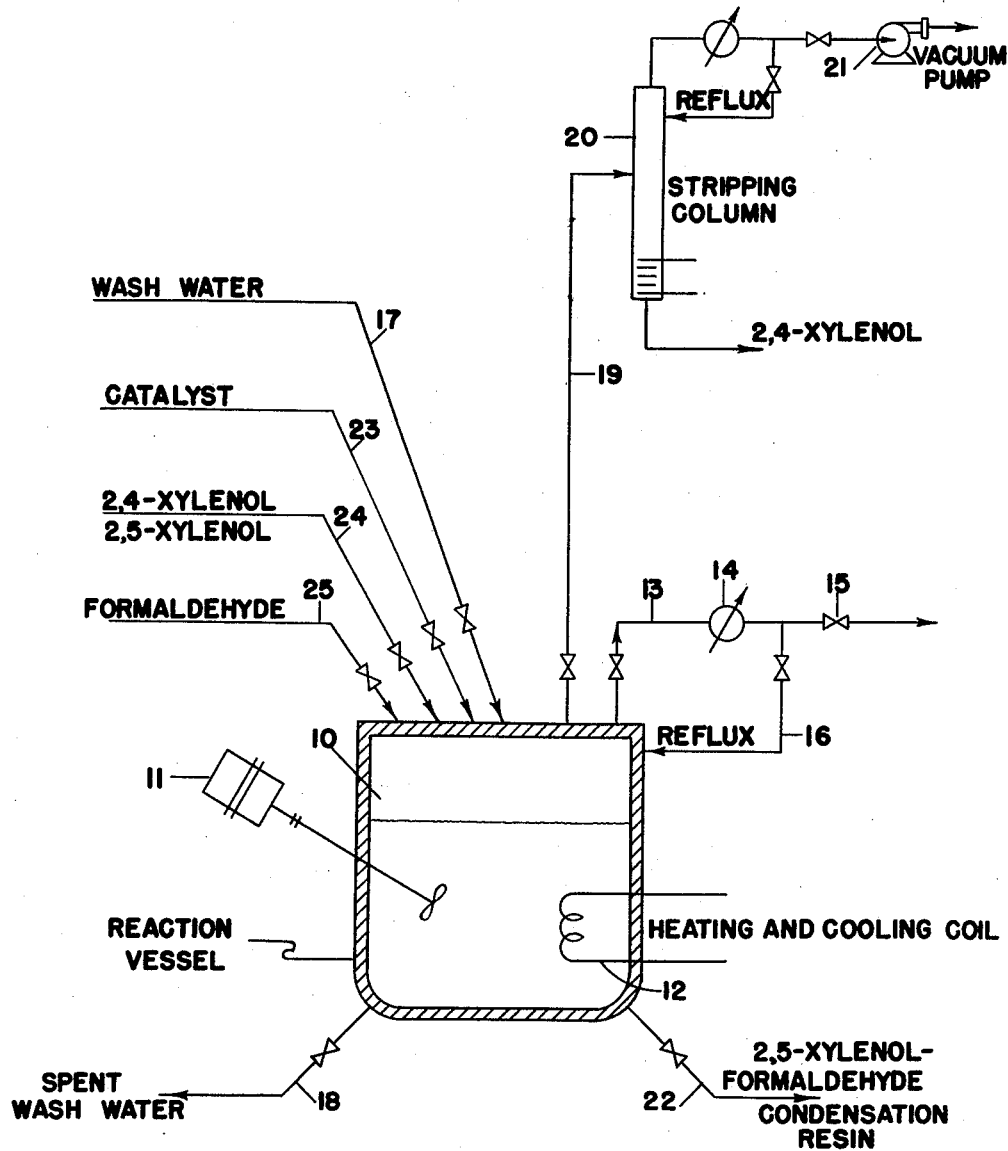

Benjamin W. Jones, Bridgeville, and Martin B. Neuworth, Pittsburgh, Pa., assignors to Consolidation Coal Company, a corporation of Pennsylvania Application February 18, 1955, Serial No. 489,103

10 Claims. (Cl. 260—57)

The present invention relates to a process for separating 2,4-xylenol from 2,5-xylenol, and more particularly, to a method for selectively resinifying 2,5-xylenol from mixtures containing 2,4-xylenol and 2,5-xylenol.

The 2,4- and 2,5-xylenols are phenolic isomers which boil at about 211° C. and occur naturally in the liquid products from the destructive distillation of coals, lignite and the like, petroleum cresylics, shale oils, liquid products from coal hydrogenation, et cetera. Distillation fractions of phenols boiling at about 211° C. contain 2,4- and 2,5-xylenol in a mixture from which they cannot be separated by conventional recovery methods (distillation, extraction, crystallization and the like). Both 2,4- and 2,5-xylenol are chemicals of commerce, commanding premium prices in a purified form. 2,4-xylenol can be employed as a starting material in the production of antioxidants for rubber and gasoline. Condensation resins of 2,5-xylenol can be used in molding compositions, varnishes, lacquers, laminating materials and the like, or can be blended with other phenolic condensation resins to modify their properties.

We have discovered a simple, inexpensive single stage treatment which permits recovery of high purity 2,4-xylenol from mixtures containing 2,4- and 2,5-xylenol; the 2,5-xylenol of the mixture is recovered in our process as a 2,5-xylenol formaldehyde condensation resin, a form in which it is adaptable to industrial uses. To effect our new separation, a mixture of 2,4- and 2,5-xylenol is treated in the presence of a strong condensation catalyst with from 0.5 to 1.2 mols of formaldehyde per mol of 2,5-xylenol in the mixture, until substantially all the formaldehyde is consumed. It is well known that formaldehyde condensation resins can be prepared from 2,4-xylenol alone and also from 2,5-xylenol alone. We have found, however, that surprisingly, the formaldehyde selectively condenses with the 2,5-xylenol from a mixture of 2,4- and 2,5-xylenol to form a clear, thermoplastic resin, leaving essentially pure 2,4-xylenol in the liquid phase catalyzate. We have found that the highly dissociated condensation catalyst may be either a strong acid or a strong alkali, although greater yields of 2,4-xylenol result from the use of acids and there is no tendency for producing thermosetting resins which sometimes result from the use of alkaline catalysis.

For a clearer understanding of the present invention, its objects and advantages, reference should be had to the following description and accompanying drawing, which is a schematic illustration of apparatus for carrying out the preferred embodiment of the present process.

Referring to the drawing, a reaction vessel 10 is provided for carrying out the present process batchwise. The reaction vessel 10 is provided with mixing apparatus 11 for agitating its contents and heating and cooling coils 12 to control the temperature of the vessel.

Leading from the reaction vessel 10 is the valved conduit 13 having a cooling condenser 14 and an atmospheric pressure relief valve 15. A valved reflux conduit 16 is provided for returning condensate from the conduit 13 to the reaction vessel 10. A valved conduit 17 is provided for introducing wash water into the reaction vessel 10, and a second valved conduit 18 is provided for removing spent wash water. A valved conduit 19 is provided for removing volatile materials to an overhead product recovery system, indicated generally by numeral 20, under the influence of a vacuum pump 21. A valved conduit 22 is provided for removing reaction products from the vessel 10. Reactant materials and reagents are introduced into the reaction vessel as indicated at 23, 24 and 25.

Feed material containing 2,4-xylenol and 2,5-xylenol is introduced into the reaction vessel 10 as indicated by the line 24. In most cases this feed material will be a distillation fraction of phenols boiling at about 211° C.; accordingly, it will consist essentially of 2,4-xylenol and 2,5-xylenol, although some cresols and isomeric xylenols may be included without affecting the process. The liquid phase catalyst which we have found essential for producing high purity 2,4-xylenol is introduced into the reaction vessel as indicated at 23. For our purposes the condensation catalyst may be a highly dissociated acid or a highly dissociated alkali in quantities up to about 10% of the weight of xylenols in the feed material. Because of their relatively low cost and convenience of handling, the preferred catalysts are concentrated hydrochloric acid or concentrated sodium hydroxide. The catalytic material should be chemically inert toward the reactant xylenols and formaldehyde; alkali metal hydroxides, amines, such as ethanolamine, sulfuric acid, oxalic acid and the like are suitable.

When the charge has been introduced into the reaction vessel 10, formaldehyde or a material which engenders formaldehyde (formalin, para-formaldehyde, trioxymethylene, etc.), is introduced gradually as indicated at 25. The contents of the reaction vessel 10 are maintained in agitation by the mixing apparatus 11. Under the conditions of the reaction, formaldehyde condenses exothermically with 2,5-xylenol in preference to the 2,4-xylenol to form a 2,5-xylenol formaldehyde condensation resin. Gradual addition of formaldehyde is continued until from 0.5 to 1.2 mols of formaldehyde have been added for each mol of 2,5-xylenol contained in the reaction vessel 10. The exothermic nature of the formaldehyde condensation causes the temperature of the reactants to rise. To control the temperature within the reaction vessel 10, either heating or cooling media can be circulated through the coil 12. If desired the catalyst may be mixed with the formaldehyde and the mixture added gradually to the reaction vessel containing the xylenol.

Following addition of the desired quantity of formaldehyde, the reaction vessel is maintained at a formaldehyde condensation reaction temperature (50 to 100° C.) until the formaldehyde has been substantially consumed. At this point, substantially all the 2,5-xylenol in the feed has been condensed into 2,5-xylenol formaldehyde resin existing in mixture with unreacted 2,4-xylenol, traces of unreacted formaldehyde, the condensation catalyst and some water.

Thereupon wash water is introduced through conduit 17 into the reaction products in the vessel 10 to cool the mixture and to extract the catalyst therefrom. Since the 2,4-xylenol and the condensation resin are insoluble in water, decantation may be employed to remove wash water through conduit 18. The washing cycle is repeated until the effluent wash water in conduit 18 is virtually neutral. Alternatively chemical neutralization may be carried out.

Thereupon 2,4-xylenol is recovered from the reaction vessel 10 by vacuum distillation by heating the reaction products by means of the heating coil 12. 2,4-xylenol, together with other volatile materials (water, formaldehyde), is flashed overhead through conduit 19 to a recovery system 20 under the influence of a vacuum pump 21. Essentially pure 2,4-xylenol is recovered as a bottom product in the recovery system 20; other volatile materials pass through the vacuum pump 21 for disposal. When substantially all the 2,4-xylenol has been flashed overhead from the reaction vessel 10, the product 2,5-xylenol formaldehyde resin may be recovered through conduit 22. Solvents, such as toluene, may be added to the reaction vessel 10 to reduce the viscosity of the resin being withdrawn through the conduit 22; in general, at the temperature existing in the vessel 10, the product resin can be withdrawn without the addition of solvents.

Variations in the preferred embodiment which has been described are permissible without departing from the scope and spirit of the present invention. For example, any recovery technique based upon differences in relative volatility may be employed, e. g., steam stripping, as a substitute for the vacuum distillation described in connection with the drawing; a solvent, such as toluene, may be added to the reaction vessel prior to commencing the reaction.

We have found that excellent results can be obtained by carrying out the reactions of the present invention at temperatures below 100° C. The required reaction time is, as expected, interdependent with the reaction temperature. In all cases, thirty minutes reaction time at a temperature of 100° C. has been sufficient to consume virtually all the formaldehyde. Where the exothermic heat of the condensation reaction is utilized to increase the temperature of the reactants concurrently with addition of formaldehyde, a final temperature of 100° C. results in complete consumption of the formaldehyde with no further reaction time.

The efficiency of recovering 2,4-xylenol is sensitive to the mol ratio of formaldehyde to 2,5-xylenol. Where the mol ratio of formaldehyde to 2,5-xylenol is low, i.e., around 0.5, much of the 2,5-xylenol is converted to bis-xylenol, a material resulting from the linking of two mols of 2,5-xylenol across one methylene group from the formaldehyde. At these low formaldehyde to 2,5-xylenol ratios, each mol of 2,5-xylenol which appears in a polymer larger than the bis-xylenol results in one mol of unreacted 2,5-xylenol which would be recovered along with the unreacted 2,4-xylenol. Since there is little tendency for the 2,4-xylenol to react, it is recovered in nearly quantitative yield, although still in mixture with the 2,5-xylenol. As the ratio of formaldehyde to 2,5-xylenol is increased, more and more long chain polymers can be produced from the 2,5-xylenol; when the ratio reaches a value of 1.0, all the 2,5-xylenol can be converted to long chain polymers. Under these conditions, virtually all the 2,5-xylenol is bound into polymers, leaving some formaldehyde for further reaction with 2,4-xylenol. Unreacted 2,4-xylenol accordingly is recovered in greater purity, but in somewhat decreased yield.

With a mol ratio of formaldehyde to 2,5-xylenol in excess of 1.0, virtually pure 2,4-xylenol can be recovered, although in less than quantitative yield. In this situation, the mol excess of formaldehyde assures the polymerization of substantially all 2,5-xylenol in the mixture; the excess formaldehyde thereupon condenses with some of the 2,4-xylenol.

The present process is particularly applicable to those mixtures of 2,4- and 2,5-xylenol containing more than 40% 2,4-xylenol. With tars produced by low temperature carbonization of bituminous coals, the isomer distribution of the distillate fraction boiling around 211° C. is about 70 weight percent 2,4-xylenol and about 30 weight percent 2,5-xylenol. Thus the present process is ideally suited to treatment of tar acid distillates from such tars. In petroleum cresylics, the distillate fraction containing 2,4-xylenol and 2,5-xylenol is about 50 to 60 percent by weight 2,4-xylenol.

For materials containing more than about 60 percent 2,5-xylenol, a satisfactory separation can be obtained by carrying out the present process in stages, e.g., conducting first a reaction with less formaldehyde on a mol basis than 2,5-xylenol in the feed (i.e., 0.2 to 0.8 mol of formaldehyde per mol of 2,5-xylenol). Thereupon the product resin is separated from the unreacted xylenol and the resulting 2,4-xylenol enriched material thus obtained is treated in the manner already described.

Results of a series of runs illustrating the operation of the present invention are reported in Table I. The feedstock for these runs was a synthetic mixture of 2,4- and 2,5-xylenol simulating a 211° C. distillation fraction of phenols obtained from low temperature carbonization tar. In each of these runs the mixture of 2,4- and 2,5-xylenol was introduced into a glass, round bottom flask and agitated mechanically with a motor driven stirrer. A measured quantity of catalyst was added and the dropwise addition of formalin was initiated. Approximately thirty minutes was required to introduce the measured quantity of formaldehyde, at which time the temperature in the flask attained a value of about 100° C. The reactants were held at 100° C. for thirty minutes, and thereupon chilled by the addition of an approximately equal quantity of distilled wash water. Following agitation between the wash water and the catalyzate, the aqueous phase was decanted and fresh distilled wash water was added. About ten washing cycles were required before the decanted wash water was neutral. Thereupon the contents of the reaction flask were vacuum distilled at 2 mm. Hg to a temperature of about 200° C. to flash overhead the unreacted 2,4-xylenol. The 2,5-xylenol resin remaining in the flask was a clear, thermoplastic resinous substance ranging from colorless to pale yellow; it exhibited good light and heat stability. The specific conditions and results of six typical runs are reported in Table I.

Table I.—Separation of 2,4- and 2,5-xylenol mixtures

| Run Designation | A [1] | B [1] | C | D | E | F [2] |
| --- | --- | --- | --- | --- | --- | --- |
| Feedstock Wt. Percent: | | | | | | |
| 2,4-xylenol | 69.3 | 69.3 | 69.3 | 69.3 | 69.3 | 69.3 |
| 2,5-xylenol | 30.7 | 30.7 | 30.7 | 30.7 | 30.7 | 30.7 |
| Catalyst: Wt. Percent of Feed | HCl | HCl | HCl | HCl | NaOH | None |
|  | 2.0 | 2.0 | 4.0 | 8.0 | 1.0 |  |
| Formaldehyde: Mols/Mol of Feed | 0.15 | 0.30 | 0.30 | 0.30 | 0.30 | 0.30 |
| Purity of Recovered 2,4-Xylenol, Wt. Percent | 87 | 89 | 92.4 | 95.1 | 96.4 | 83.7 |
| Yield of Recovered 2,4-Xylenol, Wt. Percent | 81 | 74 | 67.8 | 67.3 | 46.4 | 62.6 |

[1] Runs A and B were carried out in the presence of toluene as a diluent.
[2] Run F was carried out at 100° C. for 46 hours to assure equilibrium.

The results of runs A through E in table I show that high purity 2,4-xylenol can be recovered in good yield from mixtures of 2,4- and 2,5-xylenol such as are available in distillate fractions of tar acids from low temperature carbonization tars. In run A, the formaldehyde to 2,5-xylenol ratio was about 0.5 and the purity of 2,4- xylenol was increased from its initial value of 69.3 percent to 87 percent. By increasing the formaldehyde to 2,5-xylenol ratio to about 1.0 in run B, the purity of the resulting 2,4-xylenol was 89 percent.

Increasing the quantity of HCl used as catalyst further increased the purity of product 2,4-xylenol to 92.4 percent (run C with 4 percent HCl as catalyst) and to 95.1 percent (run D with 8 percent HCl as catalyst). A decreasing yield of the 2,4-xylenol accompanied the increasing purity of the material throughout these runs.

Run E is included to illustrate the results obtainable with NaOH as a catalyst for the partial resinification reaction. The use of 1 percent NaOH as catalyst resulted in a 96.4 percent pure 2,4-xylenol product in a yield of 46.4 percent. In general alkaline catalysts will result in equivalent purity of 2,4-xylenol although the yield will be reduced in contrast to acid catalysis.

Run F has been included in table I to illustrate the purity of 2,4-xylenol which can be expected when the selective separation is attempted in the absence of catalysts. The superiority of alkaline as well as acid catalysis is apparent.

Now, according to the provisions of the patent statutes, we have explained the principle, preferred construction and mode of operation of our invention and have illustrated and described what we now consider to represent its best embodiment. However, we desire to have it understood that, within the scope of the appended claims, the invention may be practiced otherwise than as specifically illustrated and described.

We claim:

1. A single-condensation stage process for obtaining 2,4-xylenol in a purity of at least 87 percent by weight from a mixture consisting essentially of 2,4-xylenol and 2,5-xylenol wherein 2,4-xylenol is present in from 40 to 85 percent by weight, comprising condensing said mixture with a quantity of material selected from the class consisting of formaldehyde, formalin, para-formaldehyde and trioxymethylene capable of engendering 0.5 to 1.2 mols of formaldehyde for each mol of 2,5-xylenol in the mixture, in the presence of catalytic amounts of a formaldehyde condensation catalyst selected from the class consisting of highly dissociated strong acids and strong alkalies until substantially all the formaldehyde is consumed, whereby a 2,5-xylenol formaldehyde condensation resin is formed, and separating said resin from the mixture, the 2,4-xylenol remaining in the mixture being present in a purity of at least 87 percent by weight thereof.

2. A process according to claim 1 wherein said condensation catalyst is a highly dissociated acid.

3. A process according to claim 1 wherein said condensation catalyst is a highly dissociated alkali.

4. A process according to claim 1 wherein said condensation catalyst consists of hydrochloric acid.

5. A process according to claim 1 wherein said condensation catalyst consists of sodium hydroxide.

6. A process according to claim 1 wherein said condensation catalyst consists of concentrated hydrochloric acid present in from 2 to 10 percent by weight of said mixture.

7. A single-condensation stage process for obtaining 2,4-xylenol in a purity of at least 87 percent by weight from a mixture consisting essentially of 2,4-xylenol and 2,5-xylenol wherein 2,4-xylenol is present in from 40 to 85 percent by weight, comprising condensing said mixture with 0.5 to 1.2 mols of formaldehyde for each mol of 2,5-xylenol in the mixture, in the presence of catalytic amounts of a formaldehyde condensation catalyst selected from the class consisting of strong acids and strong alkalies, until substantially all the formaldehyde is consumed, whereby a 2,5-xylenol formaldehyde condensation resin is formed, recovering 2,4-xylenol in a purity of at least 87 percent by weight from the mixture by vacuum distillation, and recovering 2,5-xylenol formaldehyde condensation resin from the material remaining after the vacuum distillation.

8. A single-condensation stage process for obtaining 2,4-xylenol in a purity of at least 87 percent by weight from a mixture consisting essentially of 2,4-xylenol and 2,5-xylenol wherein 2,4-xylenol is present in from 40 to 85 percent by weight, comprising condensing said mixture with 0.5 to 1.2 mols of formaldehyde for each mol of 2,5-xylenol in the mixture, in the presence of catalytic amounts of a formaldehyde condensation catalyst selected from the class consisting of strong acids and strong alkalies, until substantially all the formaldehyde is consumed, whereby a 2,5-xylenol formaldehyde condensation resin is formed, neutralizing the catalyzate, and separating said resin from the mixture, the 2,4-xylenol remaining in the mixture being present in a purity of at least 87 percent by weight thereof.

9. A process using two stages of condensation for obtaining 2,4-xylenol in a purity of at least 87 percent by weight from a mixture consisting essentially of about 60 percent 2,5-xylenol and the balance of 2,4-xylenol, comprising condensing said mixture with 0.2 to 0.8 mol of formaldehyde for each mol of 2,5-xylenol in said mixture, in the presence of catalytic amounts of a formaldehyde condensation catalyst selected from the class consisting of strong acids and strong alkalies, until substantially all the formaldehyde is consumed, whereby a 2,5-xylenol formaldehyde condensation resin is formed, separating said resin from the mixture, whereby an intermediate mixture of unreacted xylenols containing less than the initial amount of 2,5-xylenol remains, determining the amount of 2,5-xylenol present in said intermediate mixture, condensing said intermediate mixture with 0.5 to 1.2 mols of formaldehyde for each mol of 2,5-xylenol contained therein, in the presence of catalytic amounts of a formaldehyde condensation catalyst selected from the class consisting of strong acids and strong alkalies, until substantially all the formaldehyde is consumed, whereby a 2,5-xylenol formaldehyde condensation resin is formed, and separating said resin from the mixture, the 2,4-xylenol remaining in the mixture being present in a purity of at least 87 percent by weight thereof.

10. A single-condensation stage process for obtaining 2,4-xylenol in a purity of at least 87 percent by weight from a mixture consisting essentially of 2,4-xylenol and 2,5-xylenol wherein 2,4-xylenol is present in from 40 to 85 percent by weight, comprising condensing said mixture with 0.5 to 1.2 mols of formaldehyde for each mol of 2,5-xylenol in the mixture, in the presence of 2 to 10 weight percent of concentrated hydrochloric acid at a temperature between 50° C. and 100° C., until substantially all the formaldehyde is consumed, whereby a 2,5-xylenol formaldehyde condensation resin is formed, recovering 2,4-xylenol in a purity of at least 87 percent by weight from the mixture by vacuum distillation, and recovering 2,5-xylenol formaldehyde condensation resin from the material remaining after the vacuum distillation.

References Cited in the file of this patent

UNITED STATES PATENTS

| | | |
|---|---|---|
| 1,214,414 | Berend | Jan. 20, 1917 |
| 1,669,674 | Romieux | May 15, 1928 |
| 1,679,312 | Landt | July 31, 1928 |

OTHER REFERENCES

Ellis: "Chemistry of Synthetic Resins," vol. 1, Reinhold Pub. Co., N.Y. (1935), page 366. (Copy in Div. 60.)

Ellis: "Chemistry of Synthetic Resins," vol. 1, page 292. Reinhold Pub. Co., N.Y. (1935). Copy in Div. 50.

Ellis: "Chemistry of Synthetic Resins," vol. 1, pages 362, 363 and 365, Reinhold Publishing Co. (N.Y.) (1935). (Copy in Scientific Library.)